United States Patent [19]

Oda et al.

[11] Patent Number: 5,142,203
[45] Date of Patent: Aug. 25, 1992

[54] LIGHTING CIRCUIT FOR HIGH-PRESSURE DISCHARGE LAMP FOR VEHICLES

[75] Inventors: Goichi Oda; Masaya Shidoh; Soichi Yagi; Masatoshi Sugasawa, all of Shizuoka, Japan

[73] Assignee: Koito Manufacturing Co., Ltd., Tokyo, Japan

[21] Appl. No.: 530,525

[22] Filed: May 30, 1990

[30] Foreign Application Priority Data

Jun. 2, 1989 [JP] Japan .................................. 1-141411

[51] Int. Cl.⁵ .................................................. H05B 41/36
[52] U.S. Cl. .................................... 315/308; 315/224; 315/DIG. 7
[58] Field of Search .............. 315/303, 307, 127, 128, 315/209 R, 219, 224, 360, 241 P, DIG. 7; 323/246; 332/109-110

[56] References Cited

U.S. PATENT DOCUMENTS

| | | | |
|---|---|---|---|
| 3,689,827 | 9/1972 | Quinn | 315/308 |
| 3,999,100 | 12/1976 | Dendy | 315/308 |
| 4,039,897 | 8/1977 | Dragoset | 315/205 |
| 4,240,009 | 12/1980 | Paul . | |
| 4,392,087 | 7/1983 | Zonsky | 315/225 |
| 4,455,509 | 6/1984 | Crum | 315/225 |
| 4,724,360 | 2/1988 | Luursema . | |
| 4,766,350 | 8/1988 | Hüsgen | 315/307 |
| 4,904,907 | 2/1990 | Allison | 315/307 |
| 4,952,849 | 8/1990 | Fellows | 315/308 |
| 4,980,611 | 12/1990 | Ovenstein | 315/219 |

FOREIGN PATENT DOCUMENTS 62259391  11/1987  Japan .

Primary Examiner—Eugene R. Laroche
Assistant Examiner—A. Zarabian
Attorney, Agent, or Firm—Sughrue, Mion, Zinn Macpeak & Seas

[57] ABSTRACT

A lighting circuit for high-pressure discharge lamp or high-pressure discharge lamp for vehicular use including a DC voltage booster circuit, a voltage detector, a current detector, an a control circuit. The booster circuit boosts the input voltage from a DC voltage input terminal to provide an output voltage that is converted into an AC voltage to be applied to a high-pressure discharge lamp. The voltage detector detects the output voltage of the booster circuit. The current detector detects an output current of the booster circuit. The control circuit applies a control signal corresponding to signals from the voltage detector and the current detector to control the output voltage of the booster circuit. The control circuit, the voltage detector and the current detector constitute a feedback system for the booster circuit. Also, in lighting the discharge lamp from a cool state, therefore, the operation of the timer circuit causes transition to constant power control using rated power after execution of control so as to supply power exceeding the rated power to the output voltage detector and the output current detector sequentially.

11 Claims, 10 Drawing Sheets

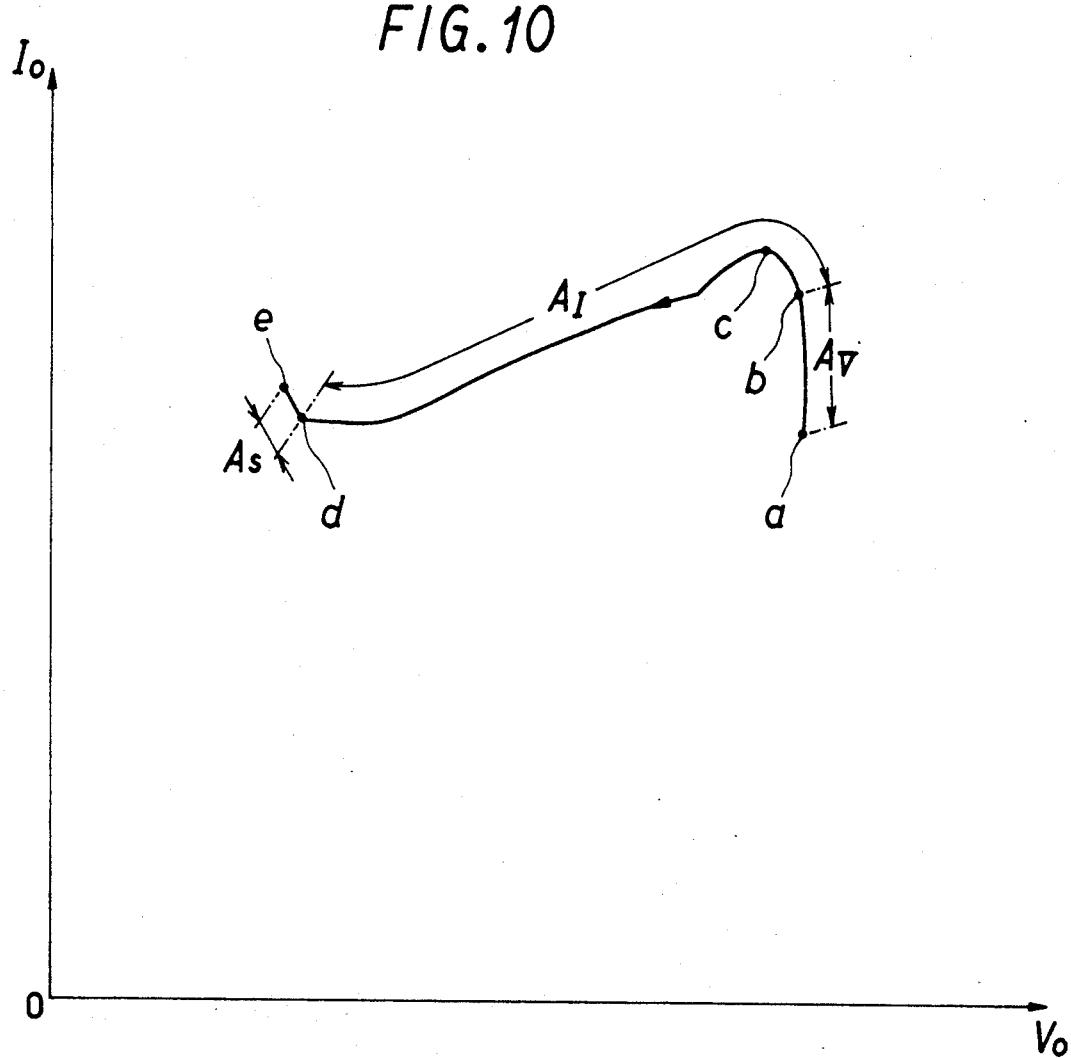

LIGHTING CIRCUIT FOR HIGH-PRESSURE DISCHARGE LAMP FOR VEHICLES

BACKGROUND OF THE INVENTION

1. Field of the Invention

The present invention generally relates to a novel lighting circuit for a high-pressure discharge lamp for vehicles. More particularly, this invention is directed to a novel lighting circuit for a high-pressure discharge lamp for vehicles, which, in addition to a DC (direct current) voltage booster circuit, has a feedback circuit that detects the output voltage and output current of the DC voltage booster circuit and sends a control signal corresponding to the detection result to the booster circuit, whereby, upon lighting of the discharge lamp, the flux of light from the lamp can reach a rated level in a considerably short period of time. This invention aims at significantly enhancing the practical use of metal halide lamps which are now attracting attention as a light source for vehicular headlamps.

2. Description of the Related Art

With regard to automobiles, there is a growing demand to improve the safety in driving at night and the aerodynamic characteristics of the body of a car so as to reduce fuel consumption. This demand also applies to the headlamps of an automobile; the safety improvement requires better visual confirmation of the headlamps while the improvement of the aerodynamic characteristics requires the headlamp being formed in a slanted shape or made more compact and flatter.

With respect to the reduction in fuel consumption, metal halide lamps have been receiving greater attention due to their having much higher light source efficiency and longer service life than halogen lamps.

A metal halide lamp has an igniting gas (argon, etc.), mercury and metal iodide filled in a glass bulb. When a high voltage is applied to a discharge electrode of this lamp, a mercury arc is generated after a discharge of the igniting gas is started, thus generating heat. The generated heat vaporizes the metal iodide, dissociating in the mercury arc, thus causing irradiation of a strong flux of light which has a specific spectrum of the metal.

A conventional lighting circuit for a high-pressure discharge lamp including such a metal halide lamp is disclosed in, for example, Unexamined Japanese Patent Publication No. 62-259391.

In order to turn on a high-pressure discharge lamp using a DC power supply, the disclosed conventional circuit comprises a DC power supply, an up-converter connected to the power supply for voltage boosting, a sinusoidal converter connected to the up-converter for converting the DC voltage from the up-converter into a sinusoidal AC (alternate current) voltage, and a starter circuit. Supplying a sinusoidal AC voltage at the time of lighting the discharge lamp eliminates unstable operation of the discharge lamp which would otherwise likely be caused by a rectangular AC voltage. Further, designing the up-converter to serve as a controllable DC voltage converter assures adjustment of the output of the lighting circuit.

Although the above-described lighting circuit can permit a high-pressure discharge lamp to be lit by a DC current, it takes time to attain a specified brightness after the discharge lamp is initially lit (starting time) or when the discharge lamp is turned on again after being turned off temporarily (restarting time). This shortcoming is fatal to a headlamp.

The source of this problem is as follows. When discharge starts with the glass bulb of the discharge lamp being cool (this event will be hereinafter referred to as "cold starting"), it takes time for the metal iodide in the glass bulb to be vaporized, and, when the discharge lamp is lit again after temporarily being turned off, the pressure in the glass bulb becomes significantly high upon elapse of a certain time, thus increasing the discharge starting voltage. There are also nonnegligible external factors such as ambient temperature.

SUMMARY OF THE INVENTION

Accordingly, it is an object of the present invention to provide an improved lighting circuit for a high-pressure vehicular discharge lamp which overcomes the above shortcoming.

To achieve this object, according to one aspect of the invention, there is provided a lamp lighting circuit which comprises a DC voltage booster circuit for boosting an input voltage from a DC voltage input terminal to provide an output voltage that is converted into an AC voltage to be applied to a high-pressure discharge lamp; a voltage detector circuit for detecting the output voltage of the DC voltage booster circuit; a current detector circuit for detecting the output current of the DC voltage booster circuit; and a control circuit for sending a control signal corresponding to signals from the voltage detector and the current detector to control the output voltage of the DC voltage booster circuit, the control circuit together with the voltage detector and the current detector constituting a feedback system for the DC voltage booster circuit.

With the above arrangement according to the present invention, the control signal based on the output voltage and the output current of the DC voltage booster circuit is fed back to the DC voltage booster circuit to control the output voltage thereof. Accordingly, the lamp voltage and current of the discharge lamp can be properly controlled in accordance with various factors such as the physical status of the discharge lamp and environmental conditions including the ambient temperature, so that the flux of light from the discharge lamp can quickly reach a stable status. According to another aspect of the invention, there is provided a lamp lighting circuit which comprises a DC voltage booster circuit for boosting the input voltage from a DC voltage input terminal to provide an output voltage that is converted into an AC voltage to be applied to a discharge lamp; an output voltage detector for detecting the output voltage of the DC voltage booster circuit and outputting a signal corresponding to the difference between the detected output voltage and a reference value; an output current detector for detecting the output current of the DC voltage booster circuit and outputting a signal corresponding to the difference between the detected output current and a reference value; a control circuit for generating a control signal corresponding to signals from the output voltage detector and the output current detector and applying the control signal to the DC voltage booster circuit to control the output voltage of the DC voltage booster circuit; and a timer means for applying a signal corresponding to the output voltage of the DC voltage booster circuit to the output current detector upon elapse of a time period corresponding to a turn-off time of the discharge lamp and adding the signal to a signal corresponding to the output current of the DC voltage booster circuit for transition to constant power control so as to make the addition result constant, whereby in lighting the discharge lamp starting from a cool state, the operation of the timer means causes transition to constant power control using the rated power after execution of control so as to supply power exceeding the rated power to the output voltage detector and the output current detector.

According to this invention, therefore, at the time of cold starting, after emission of light progresses through the control operations specified by the output voltage detector and output current detector in the specified order, i.e., the control operations for supplying power exceeding the rated power, the control transits to the constant power control mode by the operation of the timer means. Further, at the time the discharge lamp is lit again, the output voltage of the DC voltage booster circuit is controlled in accordance with the physical status of the lamp after turning off the lamp, which is indicated by the timer means. Accordingly, the flux of light from the discharge lamp can reach the stable rated level quickly.

BRIEF DESCRIPTION OF THE DRAWINGS

FIGS. 1 through 3 illustrate one embodiment of a lighting circuit for a vehicular high-pressure discharge lamp according to the present invention, of which FIG. 1 is a circuit block diagram illustrating the general circuit configuration, FIG. 2 is a circuit diagram showing the circuit configuration of essential portions, and FIG. 3 is a graph for explaining the operation of this lighting circuit.

FIGS. 4 through 10 illustrate another embodiment of a lighting circuit for a discharge lamp for vehicles according to the present invention, of which FIG. 4 is a circuit block diagram illustrating the general circuit configuration, FIG. 5 is a circuit diagram showing the circuit configuration of essential portions, FIG. 6 is a circuit diagram of a low voltage reset circuit, FIG. 8 is a circuit diagram illustrating an igniter circuit and igniter starter circuit, FIG. 9 is a schematic graph illustrating changes over time of currents and voltages of individual circuit components and changes in the flux of light from a lamp for explaining a control operation, and FIG. 10 is a graph illustrating the relation between the output voltage and output current of a DC voltage booster circuit.

DESCRIPTION OF THE PREFERRED EMBODIMENTS

A preferred embodiment of a lighting circuit for a vehicular high-pressure discharge lamp according to the present invention will now be described in detail with reference to the FIGS. 1 through 3.

Figure 1:
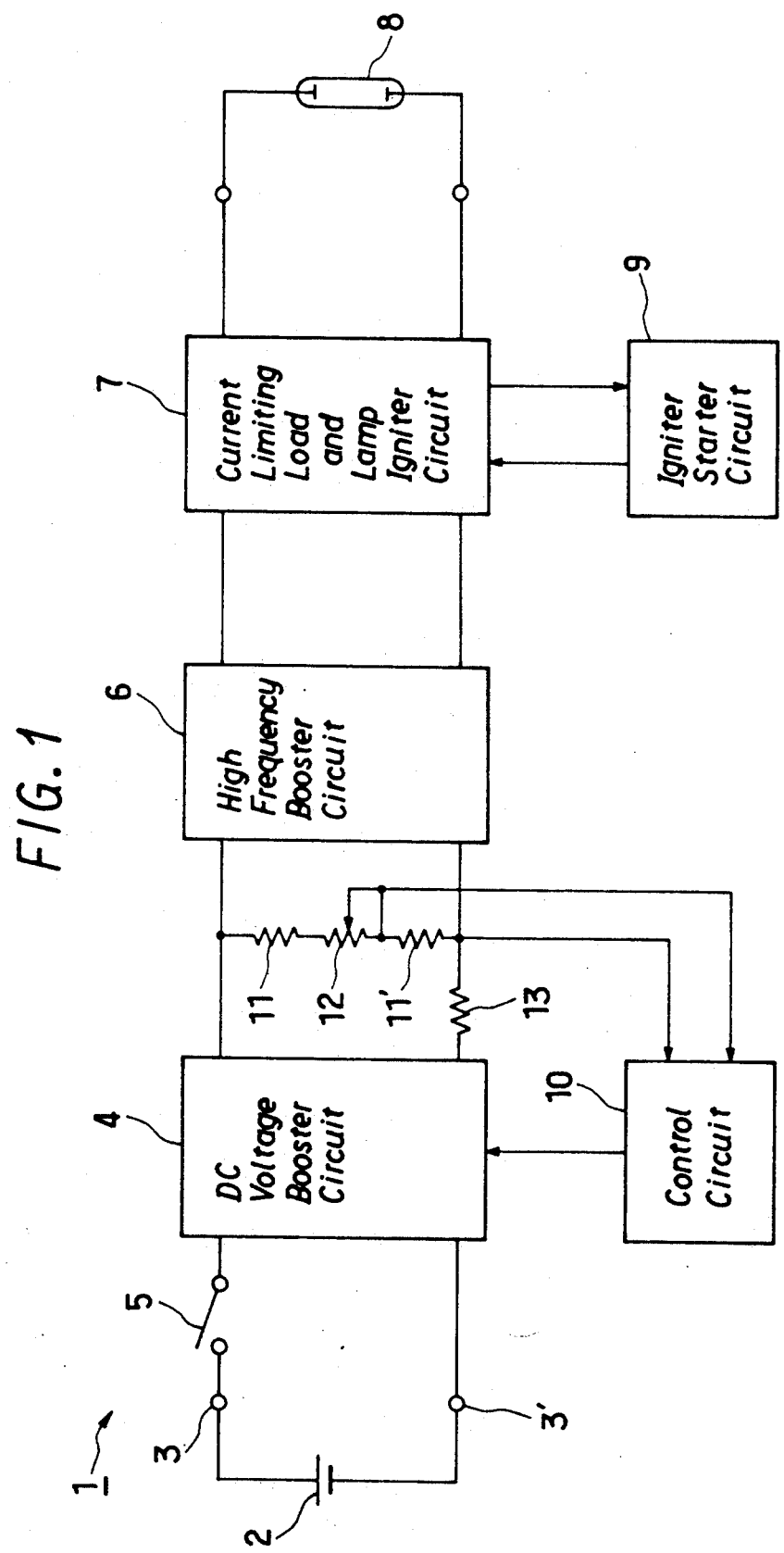
Figure 2:
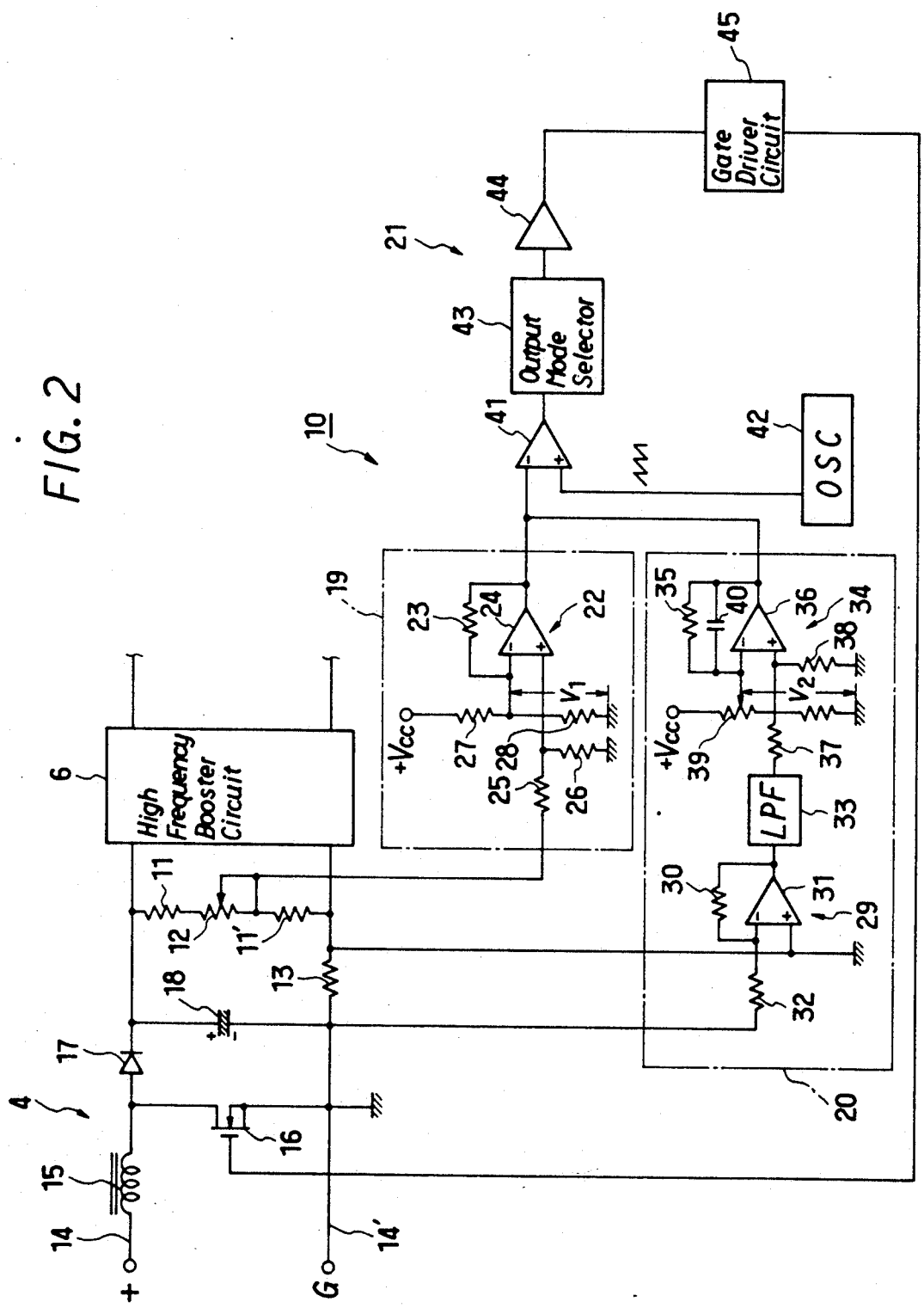

Referring to FIG. 1, reference numeral 1 denotes a lamp lighting circuit for a metal halide lamp. This lighting circuit 1 has a battery 2 which provides a DC voltage of about 12 volts. The battery 2 is connected between a pair of input terminals 3 and 3' of the lighting circuit 1.

A DC voltage booster circuit 4 has its input terminal connected to the power terminal of the battery 2 through a lighting switch 5.

A high frequency booster circuit 6 is provided at the subsequent stage of the DC voltage booster circuit 4. The booster circuit 6 converts the DC output voltage of the booster circuit 4 into a sinusoidal AC voltage. An inverter circuit of a push/pull type may serve as the high frequency booster circuit 6.

A current limiting load and lamp igniter circuit 7 is provided at the subsequent stage of the high frequency booster circuit 6. A metal halide lamp 8 is connected between the output terminals of the circuit 7.

An igniter starter circuit 9 is also connected to the current limiting load and lamp igniter circuit 7 to supply a trigger signal to the circuit 7.

A control circuit 10 generates a pulse signal with a duty cycle according to both the output voltage of the DC voltage booster circuit 4 and a voltage obtained through a sensing resistor 13, then sends the pulse signal to the DC voltage booster circuit 4 to control the output voltage of the circuit 4. The output voltage of the DC voltage booster circuit 4 is detected through resistors 11 and 11' and a variable resistor 12 located for voltage division between the output terminals of the DC voltage booster circuit 4. The voltage from the sensing resistor 13 is connected to a line connecting the DC voltage booster circuit 4 and the high frequency booster circuit 6 in order to convert the output current of the booster circuit 4 into a voltage.

When the lighting switch 5 is closed in the lamp lighting circuit 1, the igniter starter circuit 9 sends a signal to the current limiting load and lamp igniter circuit 7 so as to generate a trigger pulse which triggers the metal halide lamp 8. Then, the control circuit 10 performs boosting control for the battery voltage as needed, so that the discharge lamp transitions to the normal state.

Essential portions of the lamp lighting circuit 1 will be described in detail below.

DC Voltage Booster Circuit

The DC voltage booster circuit 4, constituted as a chopper type DC-to-DC converter, includes an inductor 15 connected to a positive line 14, an N channel field effect transistor (FET) 16, a rectifier diode 17 and a smoothing capacitor 18. The FET 16 is located at the subsequent stage of the inductor 15 and connected between the positive line 14 and a ground line 14'. The FET 16 performs its switching operation in response to a control pulse from the control circuit 10. The rectifier diode 17 has its anode connected to the drain of the FET 16 on the positive line 14. The smoothing capacitor 18 is connected between the cathode of the rectifier diode 17 and the ground line 14'.

With the booster circuit 4 constituted in the above manner, the inductor 15 stores energy when the FET 16 becomes conductive in response to a control pulse from the control circuit 10. When the FET 16 becomes nonconductive, the inductor 15 releases the stored energy, with the consequent superposition of the corresponding voltage on the input voltage, thereby boosting the DC voltage.

Control Circuit

The control circuit 10 comprises a voltage computing section 19, a current computing section 20, and a PWM (pulse width modulation) section 21. The voltage computing section 19 detects the output voltage from the DC voltage booster circuit 4 and executes differential amplification. The current computing section 20 detects a voltage corresponding to the output current from the booster circuit 4 and executes differential amplification. The PWM section 21 generates a rectangular pulse having a duty cycle corresponding to the signals from the computing sections 19 and 20, and sends the pulse to the gate of the FET 16 of the booster circuit 4.

Voltage Computing Section

A differential amplifier circuit 22 is constituted by an operational amplifier 24 and a resistor 23, which are connected in a negative feedback arrangement. The differential amplifier circuit 22 has a non-inverting input terminal of the operational amplifier 24 connected to the movable terminal of the aforementioned voltage-dividing, variable resistor 12 through a resistor 25. A resistor 26 is connected between the non-inverting input terminal and the ground line. The operational amplifier has its inverting input terminal supplied with a predetermined reference voltage (referred to as $V_1$ (V)) which is determined by voltage dividing resistors 27 and 28.

Current Computing Section

An amplifier circuit 29 includes an operational amplifier 31 and a resistor 30, which are connected in a negative feedback arrangement. The amplifier circuit 29 has its inverting input terminal connected through a resistor 32 to that end of the sensing resistor 13 which is on the side of the capacitor 18. The amplifier circuit 29 has its non-inverting input terminal connected to the other end of the sensing resistor 13. The amplifier circuit 29 serves to amplify the voltage generated across the sensing resistor 13 in accordance with the output current of the DC voltage booster circuit 4 and output the amplified voltage.

A low-pass filter 33 is provided at the subsequent stage of the amplifier circuit 29 for rectification.

A differential amplifier circuit 34 includes an operational amplifier 36 and a resistor 35, which are connected in a negative feedback arrangement. The circuit 34 has its non-inverting input terminal connected to the output terminal of the aforementioned low-pass filter 33 via a resistor 37. A resistor 38 is connected between the non-inverting input terminal of the circuit 34 and the ground line. The circuit 34 has its inverting input terminal supplied with a predetermined reference voltage (referred to as $V_2$ (V)) which is specified by a variable resistor 39.

The current computing section 20 further has a capacitor 40 connected in parallel to the feedback resistor 35 in order to slow down the response.

PWM Section

The PWM section 21 includes a comparator 41, an output mode selector 43 and a gate driver circuit 45. The comparator 41 has its minus input terminal OR-connected to the output terminals of the operational amplifiers 24 and 36, and its positive input terminal supplied with a sawtooth voltage from an oscillator 42.

The output mode selector circuit 43 is connected to the output terminal of the comparator 41 to select output signals therefrom. The output signal of the selector 43 is sent to a buffer 44.

The gate driver circuit 45 has its input terminal connected to the output terminal of the buffer 44 and its output terminal connected to the gate of the FET 16 of the DC voltage booster circuit 4. This circuit 45 serves to increase the speed of the switching operation of the FET 16.

With the above structure, the PWM section 21 produces a pulse signal with a duty cycle according to the output voltages of the differential amplifiers 22 and 34, which correspond to error amplifiers, and feeds the pulse back to the gate of the FET 16 of the DC voltage booster circuit 4. Though not shown, a circuit for specifying the maximum value of the duty cycle of this pulse signal is also provided, which is employed to control the boosting ratio of the booster circuit 4.

The operation of the lighting circuit will now be described. FIG. 3 schematically illustrates changes in time of the output voltage $V_o$ (V) and output current $I_o$ (A) of the DC voltage booster circuit 4, the potential $V_e$ (V) at the output terminals of the operational amplifiers 24 and 36, the lamp current $I_L$ (A), the lamp voltage $V_L$ (V) and the flux of light L (lm) of the metal halide lamp 8. The origin of the time axis corresponds to the time at which the light switch 5 is closed.

Figure 3:
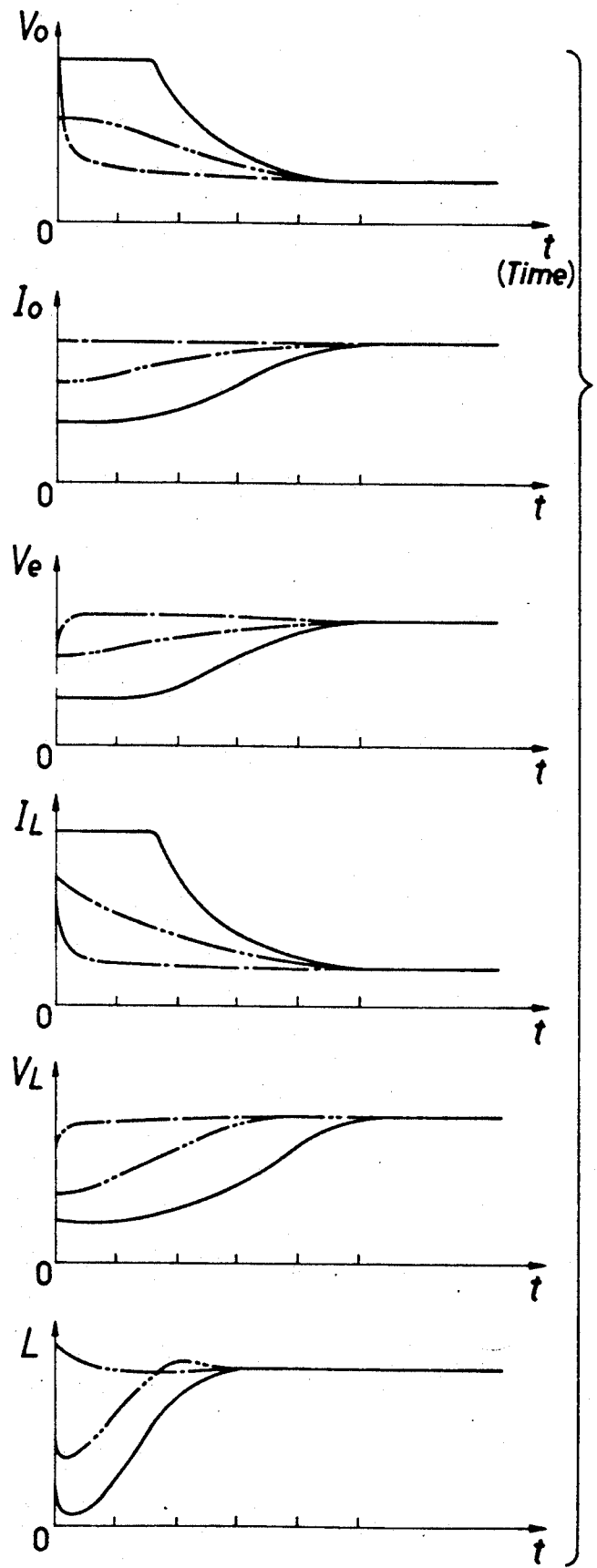

As is clear from the solid line curves in FIG. 3, at the time of cold starting, since the lamp voltage $V_L$ immediately after lighting of the discharge lamp is low, the output current $I_o$ of the DC voltage booster circuit 4 is low. As a result, the duty cycle of the pulse signal from the PWM section 21 is set to be the maximum value by the amplified output of the differential amplifier circuit 22. This increases the output voltage $V_o$ of the booster circuit 4 to a predetermined level and increases the lamp Current $I_L$, thus urging light emission from the metal halide lamp 8.

As the flux of light L of the metal halide lamp 8 increases, the lamp voltage $V_L$ rises, resulting in an increase in the output current $I_o$ of the booster circuit 4. When this output current $I_o$ reaches a predetermined level corresponding to the reference voltage $V_2$ of the differential amplifier 34, the duty cycle of the pulse signal from the PWM section 21 is then specified by the amplified output of the differential amplifier 34 so that this duty cycle decreases with an increase in $V_e$. As a consequence, the output voltage $V_o$ of the DC voltage booster circuit 4, which has been held at a high value, gradually decreases with the increase in the output current $I_o$, and the output current $I_o$ finally reaches a normal level. Accordingly, the flux of light L of the lamp sharply rises at the beginning of the lighting of the lamp, then changes to reach the rated value.

In the case where the metal halide lamp 8 is lit again after it is temporarily turned off for several seconds, the glass bulb of the lamp 8 is still hot. As is clear from curves indicated by the one-dot chain lines in FIG. 3, the lamp voltage $V_L$ immediately after re-lighting of the lamp 8 is high and the output current $I_o$ of the DC voltage booster circuit 4 is high. As a result, the duty cycle of the pulse signal of the PWM section 21 is small, so that the output voltage $V_o$ of the DC voltage booster circuit 4 decreases to near the normal voltage level immediately after the lighting of the lamp. The lamp current $I_L$ undergoes a similar change. The flux of light L quickly reaches the rated flux level.

In the case where the lamp is turned on again upon elapse of several tens of seconds after the lamp is turned off, feedback control is executed in such a way that $I_o$, $V_e$, $I_L$, $V_L$ and L take the values as indicated by the two-dot chain lines in FIG. 3, which lie between the solid lines and the one-dot chain lines for the previous two cases.

The lighting circuit 1 performs control such that the maximum value of the lamp current $I_L$ at the beginning of lighting of the metal halide lamp 8 at the time of cold starting, for which the starting time is particularly important, is specified by the voltage computing section 19, and light emission control for the lamp 8 thereafter is applied to the current computing section 20 to permit the output current $I_o$ of the DC voltage booster circuit 4 to quickly reach a predetermined level. This control prevents the starting time and restarting time from becoming significantly long due to the physical status of the metal halide lamp 8 (the temperature and internal pressure of the glass bulb, etc.), environmental conditions such as ambient temperature, or the influence of an external cause such as a change in the battery voltage. It is therefore possible to raise the flux of the lamp's light to the normal stable status in a short period of time. It is also possible to easily set the maximum value of the lamp current $I_o$ at the time of cold starting and apply a current several times greater than the rated current level of the lamp at the beginning of lighting the lamp. The present lighting circuit can therefore be effectively used for a lamp whose flux of light rises slowly.

As described above, the lighting circuit for a vehicular high-pressure discharge lamp of this invention comprises a DC voltage booster circuit for boosting an input voltage from a DC voltage input terminal to provide an output voltage that is converted into an AC (alternating current) voltage to be applied to a high-pressure discharge lamp; a voltage detector for detecting the output voltage of the booster circuit; a current detector for detecting the output current of the booster circuit; and a control circuit for applying a control signal corresponding to signals from the voltage detector circuit and the current detector circuit to control the output voltage of the DC voltage booster circuit. The control circuit together with the voltage detector and the current detector constitute a feedback system for the booster circuit.

With the above arrangement, therefore, the control signal based on the output voltage and the output current of the DC booster circuit is fed back to the booster circuit to control the output voltage thereof. Accordingly, the lamp voltage and current of the discharge lamp can be properly controlled in accordance with various factors, such as the physical status of the discharge lamp and environmental conditions including the ambient temperature, so that the flux of light from the discharge lamp can quickly reach a stable status. In addition, lighting control is executed at the DC output stage prior to DC-to-AC conversion, thus preventing the overall circuit configuration from becoming complex.

The second preferred embodiment of a lighting circuit for a vehicular discharge lamp according to the present invention will now be described in detail with reference to FIGS. 4 through 10. The illustrated embodiment is a lighting circuit for a metal halide lamp for automobiles to which the present invention is applied.

General Structure

Figure 4:
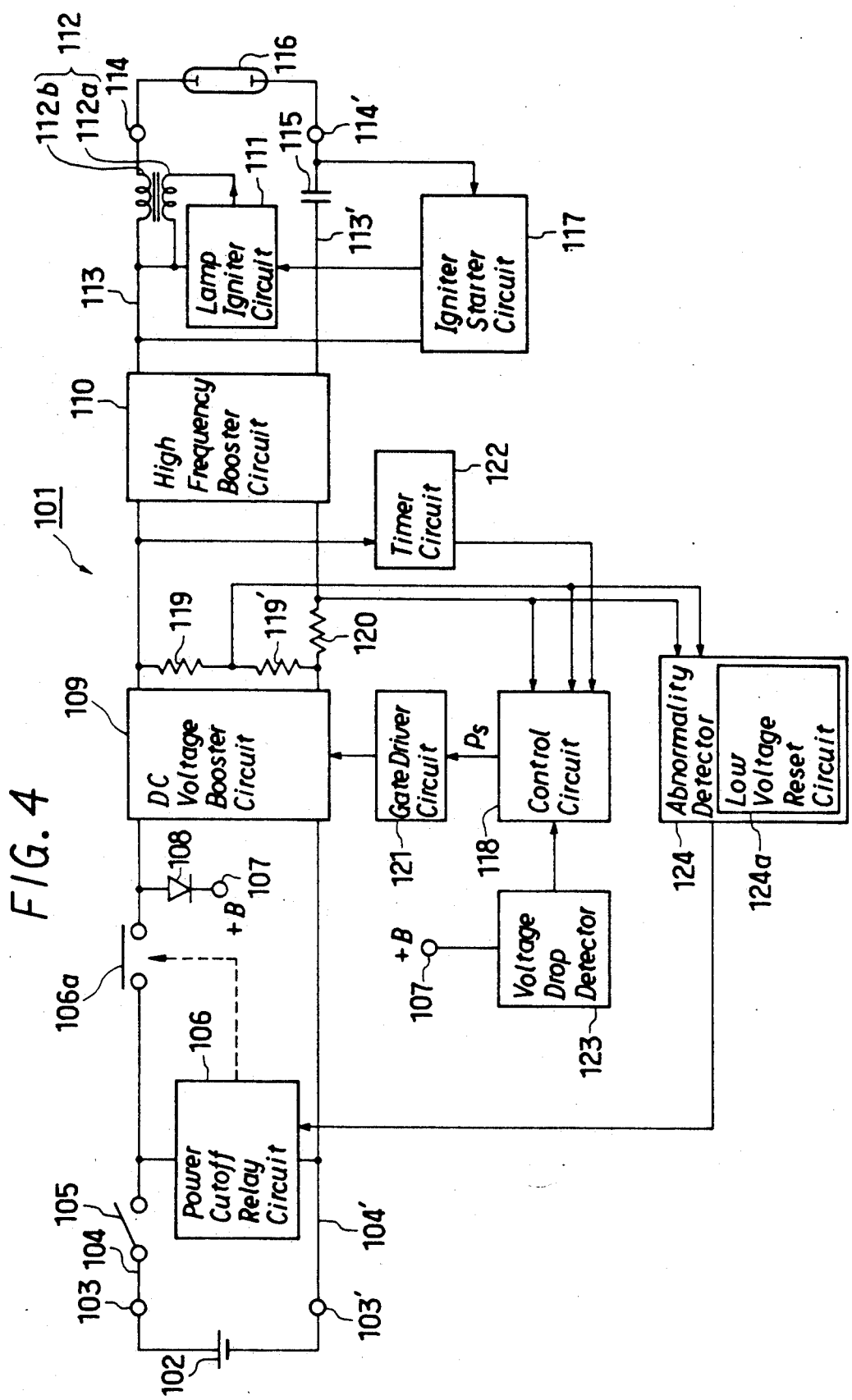
Figure 5:
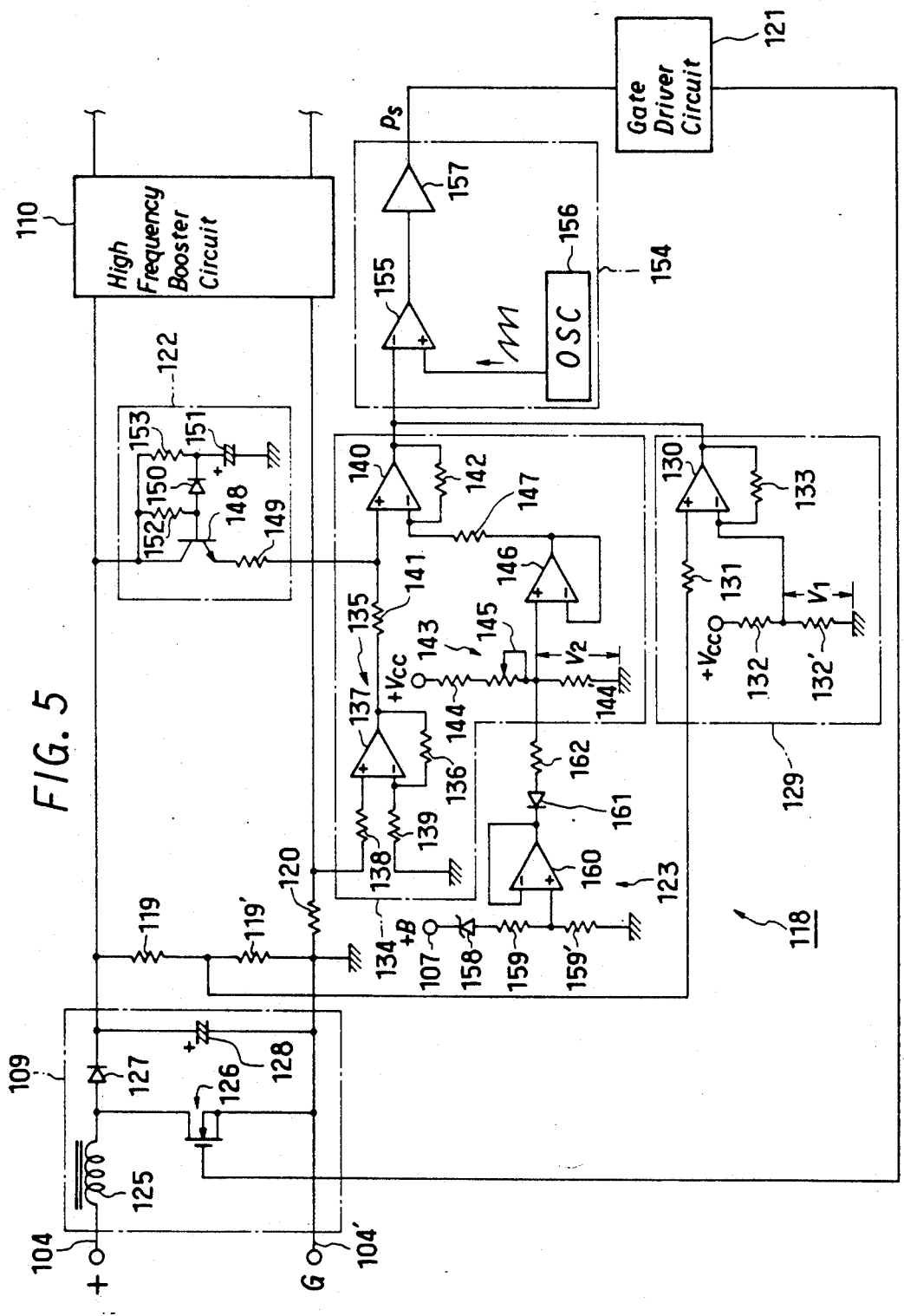
Figure 6:
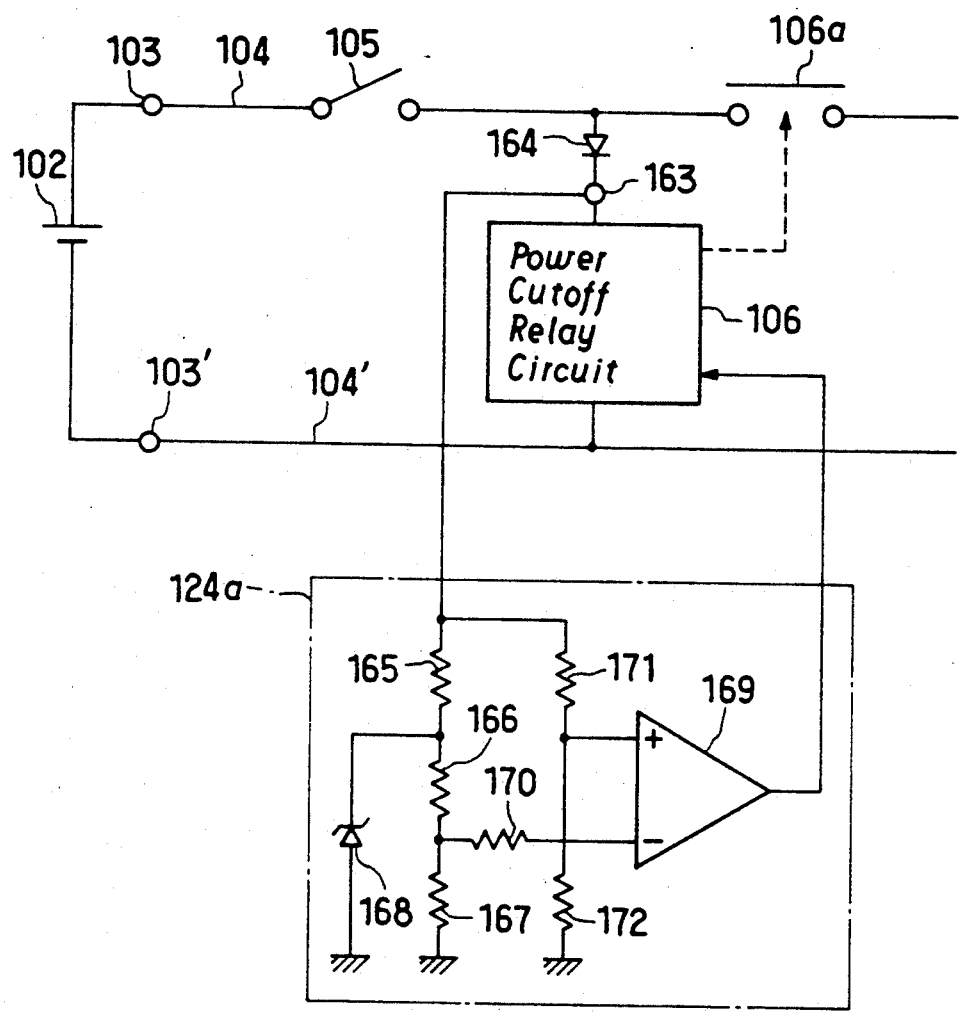

Referring to FIG. 4, a lighting circuit 101 has a battery 102 which provides a DC voltage of 12 volts. The battery 102 is connected between the DC voltage input terminals 103 and 103' of the lighting circuit 101.

Reference numerals 104 and 104' denote DC power supply lines. A lighting switch 105 is connected to the positive line 104.

Upon reception of a signal from an abnormality detector (to be described later) when an abnormality occurs in the lighting circuit, a power cutoff relay circuit 106 opens a relay contact 106a provided on the positive line 104 to stop the supply of the power supply voltage to circuits located in subsequent stages.

A power supply terminal 107 is provided to extract a power supply voltage through a diode 108 at the subsequent stage of the relay contact 106a. This power supply voltage (B (V)) is supplied to a control circuit, etc., which will be described later.

A DC voltage booster circuit 109 is provided at the subsequent stage of the power cutoff relay circuit 106. This booster circuit 109 boosts the battery voltage under the control of the control circuit (to be described later).

A high frequency booster circuit 110 is provided at the subsequent stage of the DC voltage booster circuit 109. This booster circuit 110 converts the DC output voltage of the booster circuit 109 into a sinusoidal AC voltage. An inverter circuit of a push/pull type, for example, may serve as the high frequency booster circuit 110.

An igniter circuit 111 generates a lamp trigger pulse upon reception of a signal from an igniter starter circuit (to be described later) at the beginning of lighting a lamp and applies the pulse signal to the primary winding 112a of the trigger transformer 112.

AC output lines 113 and 113' connect the output terminals of the high frequency booster circuit 110 to AC output terminals 114 and 114'. The line 113 is connected to a secondary winding 112b of a trigger transformer 112 provided on the line 113, while the other line 113' is connected to a capacitor 115. The capacitor 115 together with the secondary winding 12b constitute a current limiting load, but is also serves to detect the lamp current.

A metal halide lamp 116 having a rated power of 35 W is connected between the AC output terminals 114 and 114'.

An igniter starter circuit 117 detects whether or not the metal halide lamp 116 is turned on based on the lamp current detected by the capacitor 115, and supplies a signal for generating a trigger pulse signal to the igniter circuit 111 when the lamp is in an unlit condition.

A control circuit 118 generates a control pulse (Ps) with a duty cycle according to both the output voltage of the DC voltage booster circuit 109 and a voltage applied through a current detecting resistor 120, then sends the signal Ps to the DC voltage booster circuit 109 through a gate driver circuit 121 to control the output voltage of the circuit 109. The output voltage of the DC voltage booster circuit 109 is detected through voltage-dividing resistors 119 and 119' located between the output terminals of the booster circuit 109 at the beginning of lighting. The resistor 120 is connected to a ground line connecting one of the output terminals of the DC voltage booster circuit 109 and one input terminal of the high frequency booster circuit 110 in order to convert the output current of the booster circuit 109 into a voltage.

The control circuit 118, in response to the output voltage of the DC voltage booster circuit 109 received through a timer circuit 122, changes the control mode to constant power control for the lamp upon the elapse of a time period determined according to the turn-off time of the lamp after lighting the lamp is started. This control transition is effected because the starting time would be longer if constant power control were executed immediately after the lighting of the lamp starts. This will be described more specifically later.

A supplied voltage drop detector 123 sends a signal to the control circuit 118 when the voltage at the power supply terminal 107 falls below a predetermined level, thereby controlling the metal halide lamp 116 with control power smaller than the rated power.

An abnormality detector 124 detects an abnormality of the circuit status from the relation between the output voltage and output current of the DC voltage booster circuit 109. Upon detection of an abnormality, the detector 124 sends a signal to the power cutoff relay circuit 106 to cut off the power supply. The abnormality detector 124 has a low voltage reset circuit 124a, which sends a signal to the power cutoff relay circuit 106 to turn off the lamp when the battery voltage becomes abnormally low so as to maintain the lighting of the lamp. When the battery voltage is restored to a level equal to or greater than a predetermined level, the lamp lighting operation restarts.

Essential portions of the lamp lighting circuit 101 will be described in detail below.

DC Voltage Booster Circuit

The DC voltage booster circuit 109, constituted as a chopper type DC-to-DC converter, including an inductor 125 connected to the positive line 104, an N channel FET 126, a rectifier diode 127 and a smoothing capacitor 128. The FET 126 is located at the subsequent stage of the inductor 125 and is connected between the positive line 104 and the ground line 104'. The FET 126 performs its switching operation in response to a control pulse Ps sent through the gate driver circuit 121 from the control circuit 118. This rectifier diode 127 has its anode on the positive line 104 connected to the drain of the FET 126. The smoothing capacitor 128 is connected between the cathode of the rectifier diode 127 and the ground line 104'. In the DC voltage booster circuit, the inductor 125 stores energy when the FET 126 becomes conductive in response to the control pulse Ps from the control circuit 118 via the gate driver circuit 121. When the FET 126 becomes nonconductive, the inductor 125 releases the stored energy, with the consequent superposition of the corresponding voltage on the input voltage, thereby boosting the DC voltage.

Control Section Output Voltage Detector

An output voltage detector 129 detects the output voltage of the DC voltage booster circuit 109 through the voltage-dividing resistors 119 and 119', compares the detected voltage with a predetermined reference value, and outputs the voltage difference as an error output.

An operational amplifier 130 serving as an error amplifier has its non-inverting input terminal connected between the voltage-dividing resistors 119 and 119' through a resistor 131, and its inverting input terminal supplied with a predetermined reference voltage ($V_1$ (V)) specified by voltage-dividing resistors 132 and 132'. To one end of the resistor 132 is applied a predetermined voltage ($+V_{cc}$ (V)) from a power supply circuit (not shown).

A feedback resistor 133 is connected between the output terminal and the non-inverting input terminal of the operational amplifier 130.

Output Current Detector

An output current detector 134 detects the output current of the DC voltage booster circuit 109 as a voltage-converted value through the current-detecting resistor 120, compares the detected value with a predetermined reference value, and outputs the voltage difference as an error output.

An amplifier circuit 135 is constituted by an operational amplifier 137 and a resistor 136, which are connected in a negative feedback arrangement. The operational amplifier 137 has its non-inverting input terminal connected via a resistor 138 to one end (on the non-ground side) of the resistor 120 and its inverting input terminal grounded through a resistor 139.

An operational amplifier 140 serving as an error amplifier has its non-inverting input terminal connected via a resistor 141 to the output terminal of the operational amplifier 137, and its inverting input terminal supplied with a reference voltage ($V_2$ (V)) by a reference voltage generator 143.

A feedback resistor 142 is connected between the output terminal and inverting input terminal of the operational amplifier 140.

The reference voltage generator 143 comprises a resistor 144, a variable resistor 145 and a resistor 144', which are connected in series, and a voltage buffer 146 which receives the voltage between the variable resistor 145 and resistor 144'. The output of the voltage buffer 146 is input to the non-inverting input terminal of the operational amplifier 140 through a resistor 147. To one end of the resistor 144 is applied a predetermined voltage ($+V_{cc}$) from the power supply circuit (not shown).

Timer Circuit

The timer circuit 122 is provided to ensure transition to constant power control upon elapse of a time period corresponding to the turn-off time of the lamp after the lighting of the lamp starts. This timer circuit 122 includes an active switch device and a time constant circuit.

An NPN transistor 148 has its collector connected to the positive output terminal of the DC voltage booster circuit 109, and its emitter connected to the non-inverting input terminal of the operational amplifier 140 via a resistor 149.

The transistor 148 has its base connected to the anode of a diode 150 whose cathode is grounded through a capacitor 151 (its electrostatic capacity being denoted by $C_{151}$)

A resistor 152 (having a resistance $R_{152}$) is connected between the base and collector of the transistor 148, and a resistor 153 (having a resistance $R_{153}$) is connected between the cathode of the diode 150 and the collector of the transistor 148.

PWM Section

The PWM section 154 includes a comparator 155, which compares the input voltage with a saw-tooth voltage from an oscillator 156. Based on the comparison result, the PWM section 154 generates the control pulse Ps having a duty cycle determined according to the input voltage. More specifically, the comparator 155 has its negative input terminal connected to the output terminals of the operational amplifiers 130 and 140 and its positive input terminal connected to the output terminal of the oscillator 156. The output signal of the comparator 155 is sent through a buffer 157 to the gate driver 121.

With the above structure, the PWM section 154 produces the control pulse Ps with a duty cycle according to the output voltage of the differential amplifier 130 or 140, and feeds the pulse back to the gate of the FET 126 of the DC voltage booster circuit 109 to thereby control the output voltage of the circuit 109. Though not shown, a circuit for specifying the maximum value of the duty cycle of this pulse signal is also provided.

Voltage Drop Detector

The voltage drop detector 123 changes a reference voltage $V_2$ in the output current detector 134 in accordance with a reduction in power supply voltage B to control the power applied to the metal halide lamp 116.

The detector 123 includes a Zener diode 158 and a voltage buffer 160. The Zener diode 158 has its cathode connected to a power supply terminal 107 and its anode grounded through resistors 159 and 159'. The voltage buffer, which receives the voltage between the resistors 159 and 159', has its output terminal connected to the cathode of a diode 161. This diode 161 has its anode connected via a resistor 162 between the variable resistor 145 and the resistor 144' of the reference voltage generator 143.

Low Voltage Reset Circuit

The low voltage reset circuit 124a receives the power supply voltage from the positive line 104 to detect reduction in the battery voltage.

A power supply terminal 163 is connected via a diode 164 to the positive line at the subsequent stage of the lighting switch 105.

The circuit 124a includes a resistor 165, a Zener diode 168 and a comparator 169. The resistor 165 has its one end connected to the power supply terminal 163 and the other end grounded through resistors 166 and 167. The Zener diode 168, connected in parallel to the resistors 166 and 167, has its cathode connected between the resistors 165 and 166 and its anode grounded. The comparator 169 has its negative input terminal connected between the resistors 166 and 167 via a resistor 170, and its positive input terminal is supplied with a voltage obtained by voltage-dividing the voltage applied to the power supply terminal 163 by means of voltage-dividing resistors 171 and 172.

The output of the comparator 169 is sent to the power shielding relay circuit 106.

High Frequency Booster Circuit

Figure 7A:
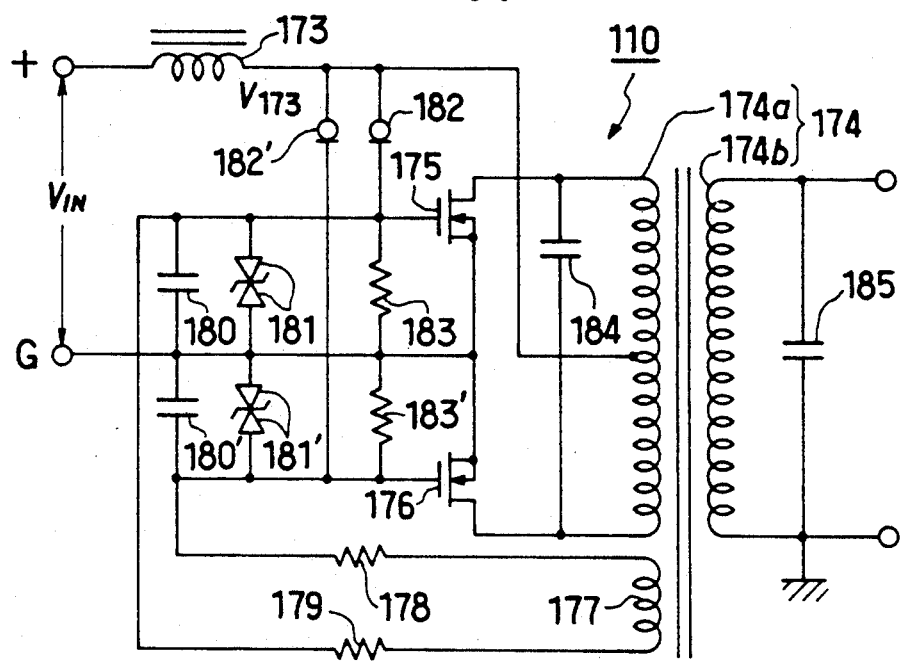
FIG. 7(A) is a circuit diagram of a high frequency booster circuit.

A self-exciting push/pull type inverter utilizing the opposite operations of two FETs as shown in FIG. 7A is used as the high frequency booster circuit 110.

A choke coil 173 has its one end connected to the positive output terminal of the DC voltage booster circuit 109 and the other end connected to the center tap of a primary winding 174a of a transformer 174.

Two N channel FETs 175 and 176 have their sources connected to ground line 104' via a resistor 120 for current detection. The FET 175 has its drain connected to one end of the primary winding 174a of the transformer 174, while the other FET 176 has its drain connected to the other end of the primary winding 174a.

A feedback winding 177 has its one end connected via a resistor 178 to the gate of the FET 176, and the other end connected via a resistor 179 to the gate of the FET 175.

A capacitor 180 and Zener diodes 181, connected in opposite bias directions, are provided between the gate and source of the FET 175. A capacitor 180' and Zener diodes 181', likewise connected in opposite bias directions, are provided between the gate and source of the FET 176. These Zener diodes 181 and 181' are provided for protection against a surge voltage.

Constant current diodes 182 and 182' serve to make a bias voltage to the FETs 175 and 176 constant to control the timing for the switching operation, thereby reducing the power loss. The diode 182 is inserted between the gate of the FET 175 and that end of the choke coil 173 which is connected to the primary winding 174a of the transformer 174. The other diode 182' is inserted between this end of the choke coil 173 and the gate of the FET 176.

A resistor 183 is connected between the gate and source of the FET 175. A resistor 183' is connected between the gate and source of the FET 176.

A capacitor 184 is connected between the two ends of the primary winding 174a of the transformer 174, and a capacitor 185 between the two ends of a secondary winding 174b.

In the thus constituted high frequency booster circuit 110, control for switching FETs 175 and 176 in the opposite directions is executed through the feedback winding 177, so as to provide a sinusoidal output through the transformer 174.

Figure 7B:
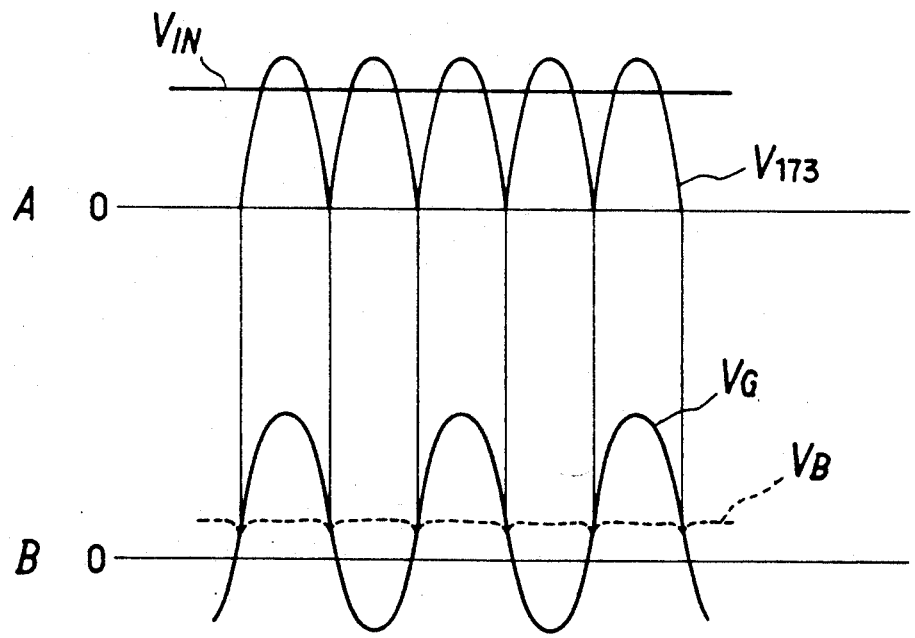
FIG. 7(B) is a schematic waveform diagram.
Figure 8:
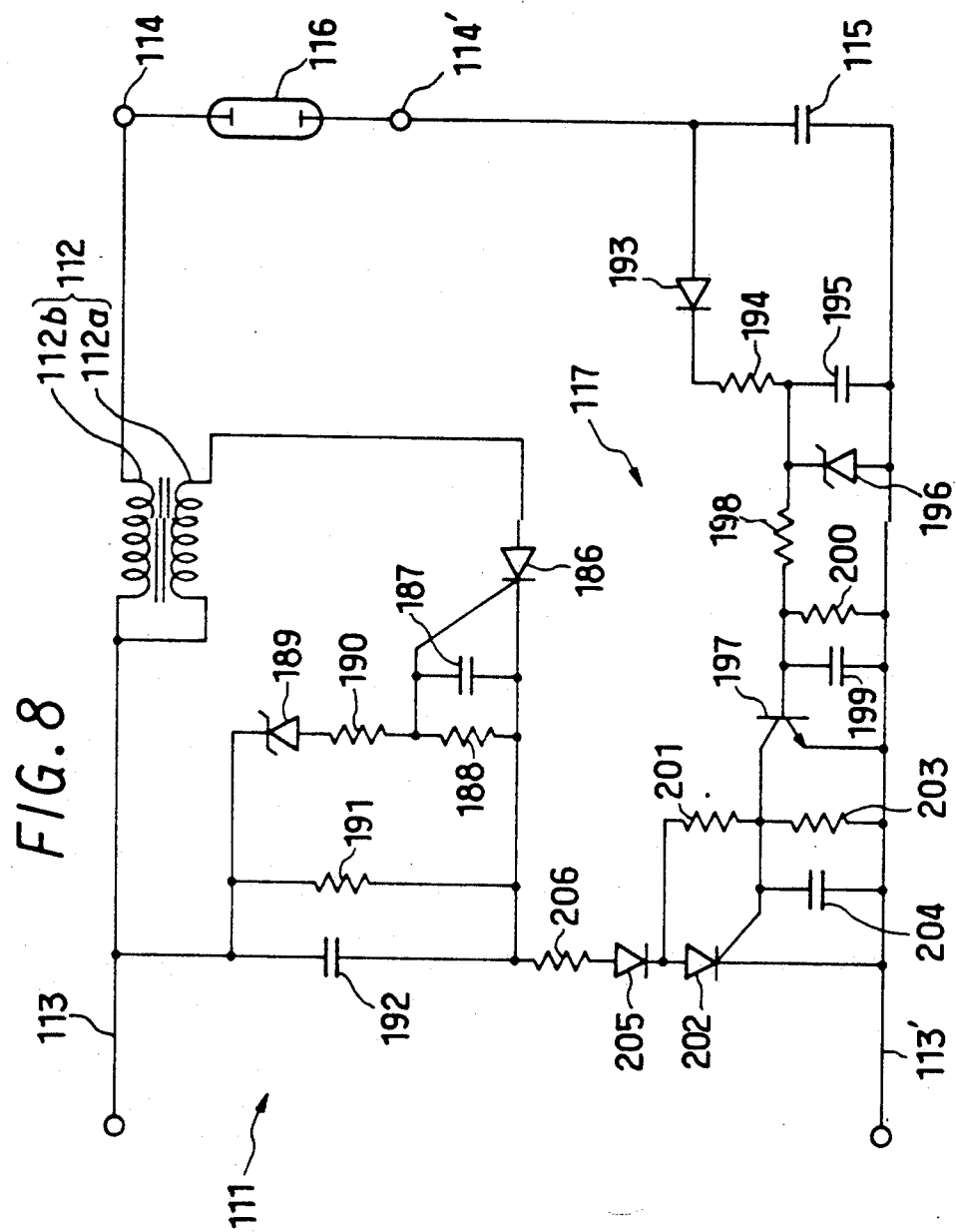

FIG. 7(B) illustrates voltage waveforms of the individual sections in the high frequency booster circuit 110; "A" in the figure shows both the input voltage $V_{IN}$ and the voltage $V_{173}$ at the subsequent stage of the choke coil 173, and "B" shows both the bias potential $V_B$ (indicated by the broken line) and the gate potential $V_G$ of the FET 175 (or 176).

In the above-described circuit, the bias voltage applied to the FETs 175 and 176 is taken from the subsequent stage of the choke coil 173 in order to prevent a variation in bias voltage from rendering the FETs 175 and 176 difficult to be turned off, resulting in both FETs being turned on at the same time. Such a problem would result in stopping oscillation and damaging the FETs due to the resultant overcurrent.

This will be described more specifically. The bias voltage to be applied to the FETs 175 and 176 is taken from the subsequent stage of the choke coil 173 through the constant current diodes 182 and 182' and resistors 183 and 183', so that the voltage $V_{173}$ has a waveform which is a sinusoidal waveform fully rectified. Therefore, the waveform of the bias potential $V_B$ has a troughs corresponding to the troughs of the voltage $V_{173}$, so that the bias potential $V_B$ drops temporarily, thus rendering the FETs in an OFF state. This action prevents both FETs from being in an ON state due to a variation in the input voltage $V_{IN}$, thus ensuring stable oscillation.

Igniter Circuit And Igniter Starter Circuit

Igniter Circuit

The primary winding 112a and the secondary winding 112b of the trigger transformer 112 are connected together at one end of each, and the common end is connected to one output terminal of the high frequency booster circuit 110. The secondary winding 112b has the other end connected to the AC output terminal 114, and the primary winding 112a has the other end connected to the anode of a thyristor 186.

A capacitor 187 and a resistor 188 are connected in parallel between the gate and cathode of the thyristor 186.

A Zener diode 189 has its anode connected to the gate of the thyristor 186 through a resistor 190 and its cathode connected to the AC output line 113.

A resistor 191 has its one end connected to the cathode of the Zener diode 189 and its other end connected to the cathode of the thyristor 186.

A capacitor 192 is provided in parallel to the resistor 191.

Igniter Starter Circuit

A diode 193 has its anode connected to the AC output terminal 114', and its cathode connected to the AC output line 113' through a resistor 194 and a capacitor 195. The diode 193, resistor 194 and capacitor 195 are connected in parallel to the capacitor 115.

A Zener diode 196 is connected in parallel to the capacitor 195.

An emitter-grounded NPN transistor 197 has its base connected via a resistor 198 to the cathode of the Zener diode 196. A capacitor 199 and a resistor 200 are connected in parallel to each other between the base and emitter of the transistor 197.

The transistor 197 has its collector connected to the gate of a thyristor 202 and to the anode of the thyristor 202 through a resistor 201. The cathode of the thyristor 202 is connected to the AC output line 113', and a resistor 203 and a capacitor 204 are connected in parallel to each other between the gate and cathode of the thyristor 202.

A diode 205 has its cathode connected to the anode of the thyristor 202 and its anode connected via a resistor 206 to the cathode of the thyristor 186 of the igniter circuit 111.

In the igniter starter circuit 117, immediately after the lighting switch 105 is closed and before the lamp is lit, the terminal voltage of the capacitor 115 is zero and the transistor 197 is turned off. The thyristor 202 is therefore in an ON state.

Accordingly, the capacitor 192 of the igniter circuit 111 is gradually charged in a half wave period of the AC output of the high frequency booster circuit 110.

The terminal voltage of the capacitor 192 is detected by a circuit which is constituted by the Zener diode 189 and resistors 188 and 190. When this terminal voltage rises and the Zener diode 189 is rendered conductive, the thyristor 186 is turned on and the capacitor 192 is discharged.

The voltage generated at this time is boosted by the trigger transformer 112 to be a trigger pulse of a high voltage level. This trigger pulse is superimposed on a sinusoidal voltage from the high frequency booster circuit 110, and the resultant voltage is applied to the metal halide lamp 116 to ignite the lamp.

Thereafter, when the lamp is lit, a voltage of a predetermined value or greater is applied to the capacitor 115, thus turning on the transistor 197. This renders the thyristor 202 in an OFF state, which stops generation of the trigger pulse.

In the above-described igniter starter circuit 117, since the power supply voltage (i.e., voltage to be supplied to the transistor 197 and thyristor 202) is obtained from the AC output lines 113 and 113', it is possible to arrange the igniter circuit 111 and igniter starter circuit 117 both on the same circuit board, and it is unnecessary to supply the power supply voltage from the power supply terminal 107 (or the power supply circuit connected to this terminal) to the igniter starter circuit 117, thus realizing a structure which can reduce the number of required wiring operations and which is not easily influenced by noise.

Control Operation

The control operation of the lighting circuit 101 will now be described with reference to two cases: the first case where the circuit status is not abnormal and the metal halide lamp 116 is lit immediately after the lighting switch 105 is set ON (hereinafter referred to as "the normal time") and the second case where an abnormality occurs in the circuit status (hereinafter referred to as "the abnormal time").

Figure 9:
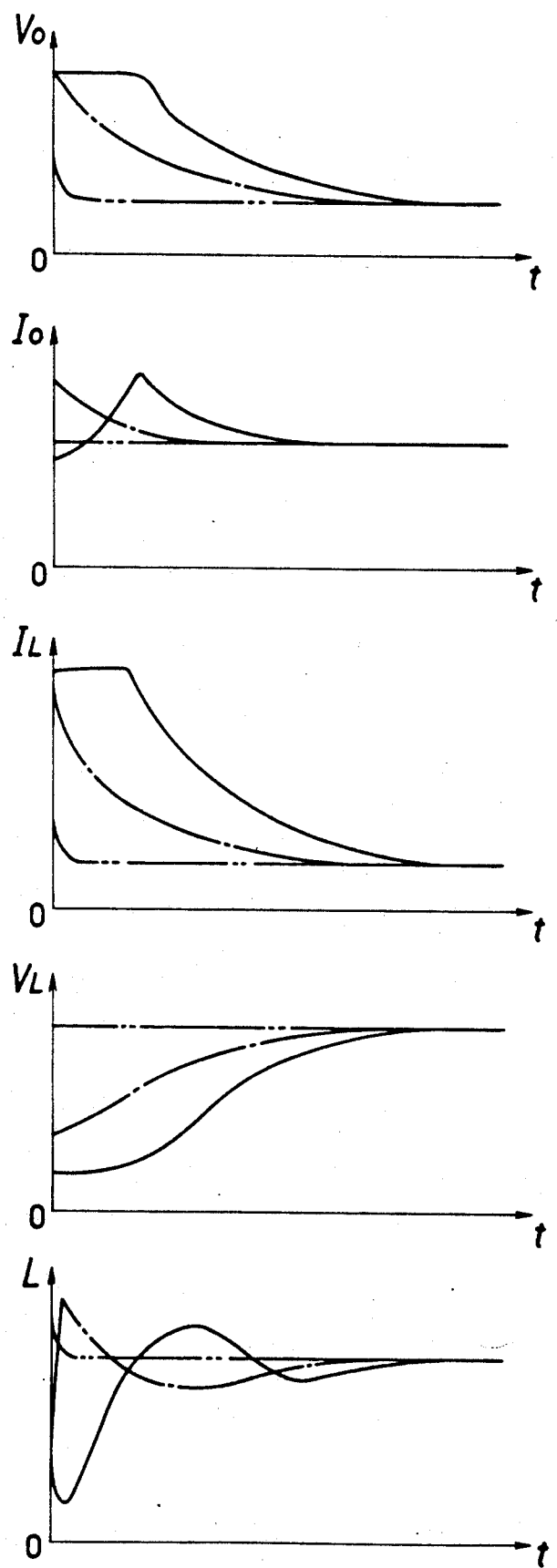

FIG. 9 schematically illustrates changes in the output voltage $V_o$ (V) and output current $I_o$ (A) of the booster circuit 109, the lamp Current $I_L$ (A), the lamp voltage $V_L$ and the flux of light, L (lm) from the metal halide lamp 116 with passage of time. The origin of the time axis t corresponds to the time at which the light switch 105 is closed. FIG. 7 presents a graph illustrating the relation between the output voltage $V_o$ taken on the horizontal scale and the output current $I_o$ taken on the vertical scale.

Normal Time

First, a description will now be given regarding the environment at the time of cold starting.

In this case, immediately after closure of the lighting switch 105, the capacitor 151 of the timer circuit 122 is uncharged and the emitter potential of the transistor 148 is low. Accordingly, only the output of the amplifier 135 is applied to the non-inverting input terminal of the operational amplifier 140 in the output current detector 134.

After the lamp is lit, however, as is clear from the solid-line graph in FIG. 9, the lamp voltage $V_L$ is low, as is the output current $I_o$ of the DC voltage booster circuit 109.

In other words, the output of the amplifier 135 (corresponding to the output current $I_o$) is smaller than the reference voltage $V_2$ from the reference voltage generator 143, so that the output of the operational amplifier 140 becomes a low (L) level.

Therefore, the PWM section 154 generates the control pulse $P_s$ having a duty cycle specified by the output voltage of the operational amplifier 130 of the output voltage detector 129, and this control pulse is sent through the gate driver 121 to the FET 126 of the DC voltage booster circuit 109.

The reference voltage $V_1$ in the output voltage detector 129 is so set as to make the output voltage $V_o$ of the booster circuit 109 high (about 2.5 to 3 times the one obtained in the normal state), thus making the output voltage $V_o$ maximum.

The point "a" in FIG. 10 indicates the state immediately after the lighting of the lamp starts. A control region $A_v$ from the point "a" to the point "b" to which the output current $I_o$ gradually increases, with the output voltage $V_o$ being approximately constant, is under the control of the output voltage detector 129.

Then, as the capacitor 151 is gradually charged, the emitter potential of the transistor 148 increases and the potential at the non-inverting input terminal of the operational amplifier 140 increases. Given that the time constant at this time is $t_1$, then $t_1 = R_{152}//R_{153}) \cdot C_{151}$, where "//" represents a parallel summation of the resistances.

When the potential reaches the level corresponding to the reference voltage $V_2$, the duty cycle of the control pulse $P_s$ is determined by the output voltage of the operational amplifier 140.

That is, as the duty cycle of the control pulse $P_s$ decreases with an increase in output voltage of the operational amplifier 140, the output voltage $V_o$, which has been held at a maximum, gradually decreases.

A control region $A_I$ from the point "b" to the point "d" passing through the peak point "c" of the output current $I_o$ is controlled by the output current detector 134.

When the capacitor 151 becomes fully charged, the transistor 148 is turned ON and its emitter potential nearly equals the output voltage $V_o$ of the DC voltage booster circuit 109. Thereafter, the control transits to the constant power control mode.

That is, since control is executed in such a way that the sum of the output voltage $V_o$ voltage-divided by the resistance ratio of the resistors 141 and 149 and the amplified output corresponding to the output current $I_o$ becomes a constant value corresponding to $V_2$, constant power control is realized in the form of a linear approximation, with $V_o.I_o$ being constant.

A region $A_s$ from the point "d" to the point "e" in FIG. 10 is a constant power region where the rated power is supplied to the metal halide lamp 116.

Thus, the flux L of light rises steeply immediately after the light is lit and shifts to the normal state after going through an overshoot.

A description will now be given regarding the operation for lighting the metal halide lamp 116 again after it has been temporarily turned off.

During the time when the lamp is turned off, the charge stored in the capacitor 151 of the timer circuit 122 is gradually discharged with a time constant $t_2$ ($=R_{153}.C_{151}$). This time constant $t_2$ is determined according to the rate of reduction in temperature of the lamp after it is turned off. When the lighting switch 105 is closed again, therefore, the lighting operation starts from the control region corresponding to the terminal voltage of the capacitor 151.

That is, proper lighting control is performed in accordance with the elapsed time required for relighting the lamp after it has once been turned off.

For instance, in the case where the lamp is lit again after several tens of seconds have elapsed after the lamp has been previously turned off, the lighting of the lamp starts from the operational point in the control region $A_I$ and the control mode changes to constant power control. Therefore, the output voltage $V_o$ and output current $I_o$ gradually decrease from the beginning of the lighting of the lamp, as shown by respective one-dot chain lines in FIG. 9, and the flux L of light from the lamp rises sharply at the beginning and becomes stable after going through an overshoot.

In the case where the metal halide lamp 116 is lit again after it is temporarily turned off for several seconds, the glass bulb of the lamp 116 is still hot. As is clear from curves indicated by the two-dot chain lines in FIG. 9, the lamp voltage $V_L$ immediately after the relighting of the lamp 116 is high and the output current Io of the booster circuit 4 is high, thereby causing a shift to constant power control, whereupon the flux L becomes stable at the rated power. The timer circuit 122 is provided to shorten the start time. That is, if the timer circuit 122 were not provided and the output voltage $V_o$ of the DC voltage booster circuit 109 directly applied to the non-inverting input terminal of the operational amplifier 140 via the resistor 149, constant power control would be executed from the beginning of the lighting of the lamp irrespective of the physical conditions of the lamp, so that the light emission from the lamp would not progress through the control region $A_V$ or $A_I$. This would delay the rise of the flux of light L.

Abnormal Time

A description will now be given regarding the case where the battery voltage is reduced.

If the battery voltage is equal to or greater than a predetermined value, for example, 10 V, the output voltage 20 of the voltage buffer 160 becomes higher than the input voltage of the voltage buffer 146 in the reference voltage generator 143 (the diode 161 being turned off during this time), so that the value of the reference voltage $V_2$ is determined by the resistors 144 and 144' and the variable resistor 145.

If the battery voltage is equal to or greater than 10 V, however, the output voltage of the voltage buffer 160 becomes lower than the voltage from the reference voltage generator 143, and the diode 161 is turned on, thus reducing the reference voltage $V_2$.

Therefore, power lower than the rated power (e.g., about 50 to 75%) is supplied to the metal halide lamp 116 in accordance with the reduction in power supply voltage B.

When the power supply voltage B is further reduced and the battery 102 cannot further maintain the lighting of the lamp, the low voltage reset circuit 124a starts functioning. In other words, when the battery voltage becomes equal to or lower than a predetermined value, for example, 7 V, this voltage is detected by the voltage-dividing resistors 171 and 172 and is compared with a given value by the comparator 169. The comparator 169 then sends a signal of a low level to the voltage cutoff relay circuit 106 to cut off the power supply to a relay coil (not shown) connected to the DC lines 104 and 104', whereupon the relay contact 106a is opened.

At the time the battery voltage returns to 7 V or greater, the output of the comparator 169 becomes a high (H) level, and the relay contact point 6(a) is closed so that the lighting operation begins again.

The abnormality detector 124 has a circuit for detecting an abnormal state, such as the metal halide lamp 116 becoming incapable of emitting light due to normal deterioration at the end of its service life, or the output stage of the high frequency booster circuit 110 becoming an open circuit. In this case, although the detailed structure of this circuit will be omitted here, the abnormal state is maintained unless the relay contact 106a is opened and the lighting switch 105 is opened temporarily and closed again.

Operation

Regarding the aforementioned lighting circuit 101, the terminal potential of the capacitor 151 in the timer circuit 122 indicates the status after the lamp is turned off and the power can be supplied to the lamp accordingly. Therefore, it is possible to shorten the start (or restart) time and stabilize the lighting of the lamp.

Particularly, at the time of cold starting for which the start time is important, excessive power is supplied to the lamp to cause the flux of light to rise, by permitting the control to go through the control region $A_V$ controlled by the output voltage detector 129 after the lighting of the lamp starts and the control region $A_I$ controlled by the output current detector 134, then by permitting transition to the normal status under constant power control (A$_S$). This control can improve the ignition characteristic.

Even if environmental conditions change or the load characteristic changes due to replacement of the lamp or at the end of the lamp's service life, the output voltage and output current of the DC voltage booster circuit 109 are detected, and a product of these values (sum of the values in approximation) is made constant, thus ensuring constant power control under the normal state of the lamp.

A change in temperature may be caused by a change in environmental conditions. This varies the inductance of the trigger transformer 112, or alters the inductance of the transformer 174 in the high frequency booster circuit 110 or the electrostatic capacities of the resonance capacitors 184 and 185, thus changing the oscillation frequency.

As described above, the lamp lighting circuit of this invention comprises a DC voltage booster circuit for boosting the input voltage from a DC voltage input terminal to provide an output voltage that is converted into an AC voltage to be applied to a discharge lamp; an output voltage detector for detecting the output voltage of the DC voltage booster circuit and outputting a signal corresponding to the difference between the detected output voltage and a reference value; an output current detector for detecting the output current of the DC voltage booster circuit and outputting a signal corresponding to the difference between the detected output current and a reference value; a control circuit for generating a control signal corresponding to signals from the output voltage detector and the output current detector and applying the control signal to the DC voltage booster circuit to control the output voltage of the DC voltage booster circuit; and a timer means for applying a signal corresponding to the output voltage of the DC voltage booster circuit to the output current detector upon elapse of a time period corresponding to a turn-off time of the discharge lamp and adding the signal to a signal corresponding to the output current of the DC voltage booster circuit for transition to constant power control so as to make the addition result constant, whereby in lighting the discharge lamp starting from a cool state, the operation of the timer means causes transition to constant power control using the rated power after execution of control so as to supply power exceeding the rated power to the output voltage detector and the output current detector.

According to this invention, therefore, at the time of cold starting, after emission of light progresses through the control operations specified by the output voltage detector and output current detector in the specified order, i.e., the control operations for supplying power exceeding the rated power, the control transits to the constant power control mode by the operation of the timer means. Further, at the time the discharge lamp is lit again, the output voltage of the DC voltage booster circuit is controlled in accordance with the physical status of the lamp after turning off the lamp, which is indicated by the timer means. Accordingly, the flux of light from the discharge lamp can reach the stable rated level quickly.

What is claimed is:

1. In a lighting circuit for a high-pressure discharge lamp for a vehicle comprising:
   a DC voltage booster circuit for boosting an input voltage from a DC voltage input terminal to provide an output voltage that is converted into an AC voltage to be applied to a discharge lamp;
   the improvement which comprises:
   an output voltage detector for detecting the output voltage of the DC voltage booster circuit and outputting a signal corresponding to a difference between the detected output voltage and a reference value;
   an output current detector for detecting an output current of the DC voltage booster circuit and outputting a signal corresponding to a difference between the detected output current and a reference value;
   a control circuit for generating a control signal corresponding to signals from the output voltage detector and the output current detector and applying the control signal to the DC voltage booster circuit to control the output voltage of the DC voltage booster circuit; and
   a timer means for applying a signal corresponding to the output voltage of the DC voltage booster circuit to the output current detector upon elapse of a time period corresponding to a turn-off time of the discharge lamp and adding said signal to a signal corresponding to said output current of the DC voltage booster circuit for transition to constant power control so as to make a result of said addition constant;
   whereby, in lighting the discharge lamp starting from a cool state, an operation of the timer means causes transition to constant power control using rated power after execution of control so as to supply power exceeding said rated power to the output voltage detector and the output current detector in order.

2. A lighting circuit according to claim 1, wherein the timer means includes:
   a time constant circuit having a discharge time constant for a lamp turn-off time and a charge time constant for a lamp turn-on time, the discharge time constant being different from the charge time constant; and
   a switch means for determining whether or not to send a signal corresponding to the output voltage of the DC voltage booster circuit to the output current detector in accordance with an output voltage of the time constant circuit.

3. A lighting circuit according to claim 1, further comprising a supplied-voltage detector for detecting a DC input voltage applied at a DC input terminal and changing the reference value of the output current detector according to a reduction in the DC input voltage, to thereby ensure boosting control so as to make power to the discharge lamp to be lower than rated power.

4. A lighting circuit according to claim 1, wherein the control circuit generates a pulse width modulation signal having a duty cycle according to the signals from the voltage detector and the current detector and sending the pulse width modulations signal to the DC voltage booster circuit to control the output voltage thereof.

5. A lighting circuit according to claim 1, further comprising:
   an igniter circuit, having a capacitor for lamp-current detection and lamp-current control connected in series with the discharge lamp, for supplying a trigger pulse to the discharge lamp until the discharge lamp is lit after reception of a lighting start command; and an igniter starter circuit for discriminating whether or not the discharge lamp is lit on the basis of a detection voltage from the capacitor and sending a signal to the igniter circuit to stop generation of the trigger pulse when the discharge lamp is lit.

6. A lighting circuit according to claim 5, wherein the lighting circuit further comprises a high frequency booster circuit for converting the output voltage of the DC voltage booster circuit into an AC voltage, and wherein a power supply voltage on an output line of the high voltage booster circuit is commonly supplied to said igniter circuit for applying a trigger pulse to the discharge lamp until the discharge lamp is lit and to said igniter starter circuit for discriminating whether or not the discharge lamp is lit.

7. A lighting circuit according to claim 1, further comprising a high frequency booster circuit for converting the output voltage of the DC voltage booster circuit into an AC voltage, the high frequency booster circuit comprising:

positive and negative input terminals, a transformer having a primary winding and a feedback winding, a choke coil having a first terminal connected to the positive input terminal and a second terminal connected to a center tap of the primary winding of the transformer, a pair of active switching elements, respectively provided between both ends of the primary winding of the transformer and the negative input terminal, for performing mutually opposite switching operations, and a bias circuit having constant current means, connected to said second terminal of the choke coil, for supplying a predetermined bias voltage based on a potential at a subsequent stage of the choke coil to the active switching elements.

8. A lighting circuit according to claim 6, wherein the high frequency booster circuit comprises:

positive and negative input terminals;

a transformer having a primary winding and a feedback winding;

a choke coil having a first terminal connected to the positive input terminal and a second terminal connected to a center tap of the primary winding of the transformer;

a pair of active switching elements, respectively provided between both ends of the primary winding of the transformer and the negative input terminal, for performing mutually opposite switching operations; and a bias circuit having constant current means, connected to said second terminal of the choke coil, for supplying a predetermined bias voltage based on a potential at a subsequent stage of the choke coil to the active switching elements.

9. A lighting circuit according to claim 1, further comprising a voltage drop detector for changing the reference value of the output current detector in accordance with a reduction in a power supply voltage to thereby control power given to the discharge lamp.

10. In a lighting circuit for a discharge lamp for a vehicle comprising a DC voltage booster circuit for boosting an input voltage from a DC voltage input terminal to provide an output voltage that is converted into an AC voltage to be applied to a high-pressure discharge lamp, the improvement comprising:

a voltage detector for detecting the output of the DC voltage booster circuit;

a current detector for detecting an output current of the DC voltage booster circuit;

a control circuit for applying a control signal corresponding to signals from the voltage detector circuit and the current detector to control the output voltage of the DC voltage booster circuit, the control circuit together with the voltage detector and the current detector constituting a feedback system for the DC voltage booster circuit;

an igniter circuit comprising a capacitor for lamp-current detection and lamp-current control connected in series with the discharge lamp for supplying a trigger pulse to the discharge lamp until the discharge lamp is lit after reception of a lighting start command;

an igniter starter circuit for discriminating whether or not the discharge lamp is lit on the basis of a detection voltage from the capacitor and sending a signal to the igniter circuit to stop generation of the trigger pulse when the discharge lamp is lit; and a high frequency booster circuit for converting the output voltage of the DC voltage booster circuit into an AC voltage, wherein a power supply voltage on an output line of the high frequency booster circuit is supplied to the igniter circuit for applying a trigger pulse to the discharge lamp until the discharge lamp is lit, and to said igniter starter circuit for discriminating whether or not the discharge lamp is lit, said high frequency booster circuit comprising:

positive and negative input terminals;

a transformer having a primary winding and a feedback winding;

a choke coil having a first terminal connected to the positive input terminal and a second terminal connected to a center tap of the primary winding of the transformer;

a pair of active switching elements, respectively provided between both ends of the primary winding of the transformer and the negative input terminal, for performing mutually opposite switching operations; and a bias circuit having constant current means, connected to said second terminal of the choke coil, for supplying a predetermined bias voltage based on a potential at a subsequent stage of the choke coil to the active switching elements.

11. In a lighting circuit for a discharge lamp for a vehicle comprising a DC voltage booster circuit for boosting an input voltage from a DC voltage input terminal to provide an output voltage that is converted into an AC voltage to be applied to a high-pressure discharge lamp, the improvement comprising:

a voltage detector for detecting the output of the DC voltage booster circuit;

a current detector for detecting an output current of the DC voltage booster circuit;

a control circuit for applying a control signal corresponding to signals from the voltage detector circuit and the current detector to control the output voltage of the DC voltage booster circuit, the control circuit together with the voltage detector and the current detector constituting a feedback system for the DC voltage booster circuit; and a high frequency booster circuit for converting the output voltage of the DC voltage booster circuit into an AC voltage, the high frequency booster circuit comprising:

positive and negative input terminals;

a transformer having a primary winding and a feedback winding;

a choke coil having a first terminal connected to the positive input terminal and a second terminal connected to a center tap of the primary winding of the transformer;

a pair of active switching elements, respectively provided between both ends of the primary winding of the transformer and the negative input terminals, for performing mutually opposite switching operations; and a bias circuit having a constant current means, connected to said second terminal of the choke coil, for supplying a predetermined biased voltage based on a potential at a subsequent stage of the choke coil to the active switching elements.

* * * * *